United States Patent [19]

Berke et al.

[11] Patent Number: 5,753,368
[45] Date of Patent: May 19, 1998

[54] FIBERS HAVING ENHANCED CONCRETE BONDING STRENGTH

[75] Inventors: Neal S. Berke, N. Chelmsford; Kevin J. Folliard, Wellesley, both of Mass.; Awdhoot Vasant Kerkar; Brian Scott Gilbert, both of Columbia, Md.

[73] Assignee: W.R. Grace & Co.-Conn., New York, N.Y.

[21] Appl. No.: 697,308

[22] Filed: Aug. 22, 1996

[51] Int. Cl.⁶ ............................................... D02G 3/00
[52] U.S. Cl. .................... 428/375; 428/364; 428/379; 428/392; 428/394; 106/711; 106/819; 106/820; 524/3; 524/4; 524/6
[58] Field of Search ........................ 428/364, 375, 428/394, 379, 392; 106/711, 802, 819, 823, 696, 790; 156/181; 524/3, 4, 6

[56] References Cited

U.S. PATENT DOCUMENTS

| 5,174,820 | 12/1992 | Sakuta et al. | 106/724 |
| 5,330,827 | 7/1994 | Hansen | 428/283 |
| 5,399,195 | 3/1995 | Hansen | 106/711 |
| 5,413,634 | 5/1995 | Shawl et al. | 106/696 |

*Primary Examiner*—Patrick Ryan
*Assistant Examiner*—J. M. Gray
*Attorney, Agent, or Firm*—Craig K. Leon; William L. Baker

[57] ABSTRACT

The bonding between concrete and fibers is enhanced by using a fiber coating material selected from certain glycol ethers, having at least three carbon atoms in an oxyalkylene group, and glycerol ethers. The present invention pertains to such coated fibers, a method for modifying a concrete using the coated fibers, and a cementitious composition containing the coated fibers.

10 Claims, No Drawings

FIBERS HAVING ENHANCED CONCRETE BONDING STRENGTH

FIELD OF THE INVENTION

The present invention relates to fibers for reinforcing concrete, and more particularly to the use of fibers coated with a concrete bond strength enhancing material such as particular glycol ethers or glycerol ethers.

BACKGROUND OF THE INVENTION

Fibers made from metal, glass, and synthetic materials, such as polyolefins, have been employed in concrete, to provide additional tensile strength and to reinforce against impact damage and crack propagation, including self-induced cracks. Polyolefin fibers, such as polypropylene, tend to be hydrophobic due to the nature of the material and require a wetting agent to provide a surface tension characteristic that allows them to become more easily dispersed within an aqueous concrete mix. U.S. Pat. No. 5,399,195 (assigned to Danaklon A/S) described polyolefin fibers that were treated with a wetting agent by passing filament bundles through lubricant application rollers. The wetting agent could be chosen from wetting agents normally applied to synthetic fibers to render them hydrophilic, such as emulsifiers, surfactants, detergents, and mixtures thereof. Examples in the '195 patent included fatty acid esters of glycerides, fatty acid amides, polyglycol esters, polyethoxylated amides, non-ionic surfactants and cationic surfactants. The prior art fiber coatings, however, are believed by the present inventors to present some problems in concrete applications. Some coating formulations which are derived from ethylene oxide or which contain fatty moieties may generate air or cause foaming that, if adjacent the fiber surface, may increase the tendency of fiber pull-out during crack formation. Accordingly, a novel coated fiber, fiber coating material, and method for modifying the properties of concrete using a novel coated fiber are needed.

SUMMARY OF THE INVENTION

In surmounting the disadvantages of the prior art, the present invention provides coated fibers having enhanced concrete bonding strength and improved pull-out resistance, and are believed to aid in suppressing the air entrainment capabilities of the cementitious mix into which the coated fibers are admixed. Fibers, preferably made of polypropylene, are coated with a material selected from particular glycol ethers, having at least three carbon atoms in an oxyalkylene group, and glycerol ethers. A preferred glycol ether fiber coating material is di-propylene glycol-t-butyl ether; while a preferred glycerol ether fiber coating is di-t-butyl glycerol. An exemplary method of the invention for modifying the properties of a concrete comprises adding to a concrete, mortar, or cement mix, in an amount of 0.05 to 10% weight, and more preferably an amount of 0.1 to 5%, based on the total dry weight of cement, fibers having a coating material mentioned above; and mixing the resultant mix. The present invention also pertains to cementitious compositions comprising the above-described coated fibers.

DETAILED DESCRIPTION OF EXEMPLARY EMBODIMENTS

The terms "paste", "mortar" and "concrete" are terms of art: pastes are mixtures composed of a hydraulic cement binder (usually, but not exclusively, Portland cement, Masonry cement, or Mortar cement, and may also include limestone, hydrated lime, fly ash, blast furnace slag, and silica fume or other materials commonly included in such cements) and water; mortars are pastes additionally including fine aggregate; and concretes are mortars additionally including coarse aggregate. "Cementitious" compositions of the invention may be formed by mixing required amounts of certain materials, e.g., a hydraulic cement, water, and fine or coarse aggregate, as may be desired, with coated fibers as hereinafter described.

A method of the present invention for modifying the properties of a concrete comprises: adding to a concrete, mortar, or cement mix, in an amount of 0.05 to 10% weight based on the total dry weight of cement, fibers having a coating material selected from the group consisting of glycol ether and glycerol ether; mixing the resultant mix to obtain a concrete, mortar, or paste mix in which the individual fibers are homogeneously distributed; and casting the mix into a configuration. More preferably, the addition amount of coated fiber is 0.1–5%, and more preferably 0.5–2%, based on the total dry weight of cement. The term "configuration" means and refers to a wall, floor, panel, block, paver, or other component of a building or civil engineering structure, such as a building, parking garage, bridge deck, tunnel, and the like, which is formed by cast concrete. The coated fibers of the invention may also be used in mortars.

Exemplary fibers of the invention comprise steel, glass, carbon fiber, cellulose, rayon, or synthetic materials such as polyolefins, nylon, polyester, and acrylics. Polyolefins such as polypropylene are preferred. Polypropylene fibers may be in monofilament, collated fibrillated, ribbon form, or have other shapes and come in an array of various sizes and dimensions. Fibers may also be bundled using mechanical or chemical means, or may even be introduced into cementitious compositions using special packaging technology (See, e.g., U.S. Pat. No. 5,224,774 of W. R. Grace). Fibers of the invention may be coated during or after the fiber manufacturing process using known methods.

Exemplary coated fibers of the present invention are coated with a glycol ether having the formula:

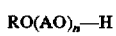

wherein R comprises $C_1$–$C_7$ alkyl group or $C_5$–$C_7$ cycloalkyl group; A comprises a $C_3$–$C_4$ alkylene group; O is oxygen; n represent an integer 1 through 10, and H is hydrogen. The AO groups (e.g., "oxyalkylene") forming the chain of such glycols may contain a single type of alkylene ether group or a mixture of alkylene ether groups which may be in block or random arrangement. The present invention contemplates that an oxyalkylene group will have at least three carbon atoms.

Preferred glycol ethers are:

di-propylene glycol-t-butyl ether, having the formula

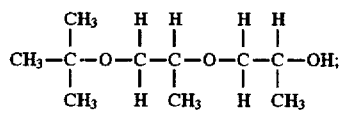

di-propylene glycol-n-butyl ether, having the formula

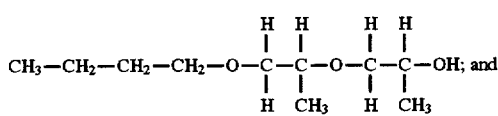

di-propylene glycol-n-propyl ether, having the formula

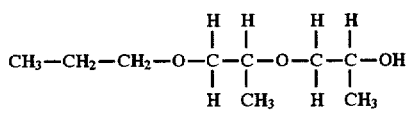

Other exemplary coated fibers of the present invention are coated with a glycerol ether having the formula:

$$\begin{array}{l} CH_2-(AO)_x-OR_1 \\ | \\ CH_2-(AO)_y-OR_2 \\ | \\ CH_2-(AO)_z-OR_3 \end{array}$$

wherein $R_1$, $R_2$, and $R_3$ are hydrogen or a $C_1$–$C_{14}$ alkyl group, at least one of said $R_1$, $R_2$, and $R_3$ comprises a $C_1$–$C_{14}$ alkyl group; A is a $C_2$–$C_4$ group; and x, y, and z are integers from 0–10.

A preferred glycerol ether is di-t-butyl glycerol, having the formula

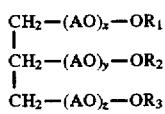

The invention is further illustrated by the following, non-limiting examples.

EXAMPLE 1

This example illustrates the relative air entrainment performance of an ethylene glycol, namely, triethylene glycol monobutyl ether (available from Union Carbide under the name "butoxytriglycol"), which is chemically similar to a known wetting agent, polyethylene glycol-lauryl ether (See e.g., Col. 8, ll. 10–12, U.S. Pat. No. 5,399,195) in comparison to di-propylene glycol-t-butyl ether as contemplated in the present invention. A control sample mortar was made using 2% by weight of an air entrainer (based on the dry weight of cement). The air entrainer is available from W. R. Grace & Co.-Conn., Cambridge, Mass., under the name DARAVAIR® 1000. A second mortar sample was prepared using triethylene glycol monobutyl ether ("butoxytriglycol") in an amount of 2% (c wt.). A third mortar sample was prepared containing di-propylene glycol-t-butyl ether ("DPTB") also in an amount of 2% (c wt.). The samples were mixed for nine minutes, and air content was determined in accordance with ASTM C185 (1994). The results are summarized in the following table and demonstrate that the ethylene glycol ("butoxytriglycol") entrained air in an amount similar to the control sample. However, sample 3 containing DPTB surprisingly demonstrated nearly two-thirds less entrained air.

TABLE 1

| Sample | Entrained Air (ASTM C185 1994) |
|---|---|
| 1 Control | 24% |
| 2 Butoxytriglycol | 20% |
| 3 DPTB | 7% |

EXAMPLE 2

This test measured the pull-out resistance of various coated fibers. Polypropylene fibers having a length of two (2) inches and a diameter of 0.0255×0.0395 inches were used to make three samples. Sample 1 comprised polypropylene fibers having a coating comprising polyethylene glycol mono laurate ("PEG mono laurate"), an ester having about 400–500 molecular weight. Sample 2 was prepared by coating another identical number of the polypropylene fibers with butoxytriglycol. Sample 3 was prepared by coating another identical set of fibers with di-propylene glycol-t-butyl ether ("DPTB"). The two-inch fibers were coated by dipping into the coating materials, allowed to air dry, and then the coated portion was embedded into identical cement pastes (slurry) such that the embedded length of the fibers was one inch. The cement was allowed to cure for 24 hours at 100% relative humidity. The three samples were tested in an Instron 1011 which measured the load (in pounds) needed to displace the fibers from the cement. Pull-out resistance, or bond strength (psi), was calculated by determining the average peak load required to displace the fibers, and dividing this by the average surface area of fiber contacting the cementitious matrix. The following table summarizes the relative bond strengths computed for each of the three fiber samples.

TABLE 2

| Sample | Fiber Coating Material | Peak Load (lbs.) | Average Load (lbs.) | Bond Strength (psi) |
|---|---|---|---|---|
| 1 | PEG mono laurate | 2.90 | | |
|  | PEG mono laurate | 2.00 | | |
|  | PEG mono laurate | 2.92 | 2.61 | 12.48 |
| 2 | Butoxytriglycol | 2.40 | | |
|  | Butoxytriglycol | 2.60 | | |
|  | Butoxytriglycol | 2.80 | | |
|  | Butoxytriglycol | 2.20 | | |
|  | Butoxytriglycol | 3.90 | 2.72 | 13.02 |
| 3 | DPTB | 2.80 | | |
|  | DPTB | 3.60 | | |
|  | DPTB | 3.00 | | |
|  | DPTB | 3.40 | 3.2 | 15.32 |

Sample 1 demonstrated a bond strength of 12.48 psi (with a standard deviation of 0.53). Sample 2 demonstrated a similar bond strength of 13.02 psi (with a standard deviation of 0.54). However, Sample 3, which involved di-propylene glycol-t-butyl ether ("DPTB") as the coating material, demonstrated a comparatively enhanced bond strength of 15.32 psi (standard deviation of 0.37).

The foregoing examples are provided for illustration only and are not intended to limit the scope of the invention, as claimed.

We claim:

1. A method for modifying the properties of a concrete comprising:
adding to a concrete, mortar, or cement mix, in an amount of 0.05 to 10% by weight based on the total dry weight of cement, fibers comprising a material selected from the group consisting of steel, glass, acrylics, and polyolefin and having a coating material selected from the group consisting of a glycol ether and a glycerol ether, mixing the resultant mix to obtain a concrete, mortar, or paste mix in which the individual fibers are homogeneously distributed; and casting the mix into a configuration; said glycol ether having the formula $$RO(AO)_n\text{—H}$$

wherein R comprises $C_1$–$C_7$ alkyl group or a $C_5$–$C_7$ cycloalkyl group; A comprises a $C_3$–$C_4$ alkylene group; O is oxygen; n represents an integer 1 through 10, and H is hydrogen; and said glycerol ether having the formula:

$$\begin{array}{l} CH_2\text{—}(AO)_x\text{—}OR_1 \\ | \\ CH_2\text{—}(AO)_y\text{—}OR_2 \\ | \\ CH_2\text{—}(AO)_z\text{—}OR_3 \end{array}$$

wherein $R_1$, $R_2$, and $R_3$ are hydrogen or a $C_1$–$C_{14}$ alkyl group, at least one of said $R_1$, $R_2$, and $R_3$ comprises a $C_1$–$C_{14}$ alkyl group; A is a $C_2$–$C_4$ group; and x, y, and z are integers from 0–10.

2. The method of claim 1 wherein said fibers comprise polypropylene.

3. The method of claim 2 wherein said fiber coating material comprises a glycol ether selected from the group consisting of di-propylene glycol-t-butyl ether, di-propylene glycol-n-butyl ether, and di-propylene glycol-n-propyl ether.

4. The method of claim 3 wherein said glycol ether comprises comprises di-propylene glycol-t-butyl ether.

5. The method of claim 3 wherein said fiber coating material comprises a glycerol ether having the formula:

$$\begin{array}{l} CH_2\text{—}(AO)_x\text{—}OR_1 \\ | \\ CH_2\text{—}(AO)_y\text{—}OR_2 \\ | \\ CH_2\text{—}(AO)_z\text{—}OR_3 \end{array}$$

wherein $R_1$, $R_2$, and $R_3$ are hydrogen or a $C_1$–$C_{14}$ alkyl group, at least one of said $R_1$, $R_2$, and $R_3$ comprises a $C_1$–$C_{14}$ alkyl group; A is a $C_2$–$C_4$ group; and x, y, and z are integers from 0–10.

6. The method of claim 5 wherein said glyerol ether is di-t-butyl glycerol, and said fibers comprise polypropylene.

7. Coated fibers for modifying the properties of a concrete comprising: a plurality ol fibers comprising a material selected from the group consisting of steel, glass, acrylics, and polyolefin and coated with a material selected from the group consisting of a glycol ether and a glycerol ether; said glycol ether having the formula $$RO(AO)_n\text{—H}$$

wherein R comprises $C_1$–$C_7$ alkyl group or $C_5$–$C_7$ cycloalkyl group; A comprises a $C_3$–$C_4$ alkylene group; O is oxygen; n represents an integer 1 through 10, and H is hydrogen; and said glycerol ether having the formula:

$$\begin{array}{l} CH_2\text{—}(AO)_x\text{—}OR_1 \\ | \\ CH_2\text{—}(AO)_y\text{—}OR_2 \\ | \\ CH_2\text{—}(AO)_z\text{—}OR_3 \end{array}$$

wherein $R_1$, $R_2$, and $R_3$ are hydrogen or a $C_1$–$C_{14}$ alkyl group, at least one of said $R_1$, $R_2$, and $R_3$ comprises a $C_1$–$C_{14}$ alkyl group; A is a $C_2$–$C_4$ group; and x, y, and z are integer from 0–10.

8. The coated fibers of claim 7 wherein said fiber coating material comprises a glycol ether selected from the group consisting of di-propylene glycol-t-butyl ether, di-propylene glycol-n-butyl ether, and di-propylene glycol-n-propyl ether.

9. The coated fibers of claim 8 wherein said fiber comprises polypropylene and said fiber coating material is di-propylene glycol-t-butyl ether.

10. A cementitious composition comprising a hydraulic cementitious binder, water, a fine aggregate, and a plurality of fibers comprising a material selected from the group consisting of steel, glass, acrylics, and polyolefin, said fibers being coated with a material selected from the group consisting of a glycol ether and a glycerol ether; said glycol ether having the formula $$RO(AO)_n\text{—H}$$

wherein R comprises $C_1$–$C_7$ alkyl group or $C_5$–$C_7$ cycloalkyl group; A comprises a $C_3$–$C_4$ alkylene group; O is oxygen; n represents an integer 1 through 10, and H is hydrogen; and said glycerol ether having the formula:

$$\begin{array}{l} CH_2\text{—}(AO)_x\text{—}OR_1 \\ | \\ CH_2\text{—}(AO)_y\text{—}OR_2 \\ | \\ CH_2\text{—}(AO)_z\text{—}OR_3 \end{array}$$

wherein $R_1$, $R_2$, and $R_3$ are hydrogen or a $C_1$–$C_{14}$ alkyl group, at least one of said $R_1$, $R_2$, and $R_3$ comprises a $C_1$–$C_{14}$ alkyl group; A is a $C_2$–$C_4$ group; and x, y, and z are integers from 0–10.

* * * * *